United States Patent
Lenz et al.

(10) Patent No.: US 12,545,628 B2
(45) Date of Patent: Feb. 10, 2026

(54) SHEATHED METALLIC NEEDLES FOR PRODUCING Z-CHANNELS IN FIBROUS PREFORMS

(71) Applicant: Raytheon Technologies Corporation, Farmington, CT (US)

(72) Inventors: Brendan Lenz, Wethersfield, CT (US); Molly Kole, Hartford, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/123,037

(22) Filed: Mar. 17, 2023

(65) Prior Publication Data

US 2024/0308921 A1   Sep. 19, 2024

(51) Int. Cl.
*C04B 35/80* (2006.01)
*C04B 35/628* (2006.01)
*C04B 35/64* (2006.01)

(52) U.S. Cl.
CPC ........ *C04B 35/80* (2013.01); *C04B 35/62863* (2013.01); *C04B 35/62884* (2013.01); *C04B 35/64* (2013.01); *C04B 2235/3826* (2013.01); *C04B 2235/5244* (2013.01); *C04B 2235/5252* (2013.01); *C04B 2235/612* (2013.01)

(58) Field of Classification Search
CPC .......... D04H 18/02; D04H 18/00; D04H 1/46; B29B 11/16; B26F 1/24; B26F 1/16; C04B 2235/5276; B29C 66/02242; B29C 2793/0045; B32B 2038/042
See application file for complete search history.

(56) References Cited

U.S. PATENT DOCUMENTS

| | | | |
|---|---|---|---|
| 2,289,177 A | 7/1942 | Jermain | |
| 2,611,434 A | 9/1952 | Mugler | |
| 3,877,120 A | 4/1975 | Okamoto et al. | |
| 4,486,372 A | 12/1984 | Millard et al. | |
| 4,767,095 A | 8/1988 | Fitzgerald et al. | |
| 5,035,033 A * | 7/1991 | Leuchtenmuller | D04H 18/02 28/115 |
| 5,066,442 A | 11/1991 | Gutowski et al. | |
| 5,188,625 A | 2/1993 | Van et al. | |
| 5,246,520 A | 9/1993 | Scanlon et al. | |
| 5,372,494 A | 12/1994 | Vaughan | |
| 5,372,668 A | 12/1994 | Bracesco | |
| 5,515,585 A | 5/1996 | Sheehan et al. | |

(Continued)

FOREIGN PATENT DOCUMENTS

| | | | |
|---|---|---|---|
| CN | 201483574 U | * | 5/2010 |
| CN | 108215246 A | | 6/2018 |

(Continued)

OTHER PUBLICATIONS

DE10356900A1 Espacenet English Machine Translation (Year: 2025).*

(Continued)

*Primary Examiner* — Nahida Sultana

(74) *Attorney, Agent, or Firm* — Kinney & Lange, P.A.

(57) ABSTRACT

A needle array suitable for perforating a fibrous preform includes a backplate, a plurality of needles removably attached to and extending away from the backplate, and a collar disposed around each of the plurality of needles. Each of the plurality of needles includes a metallic body, and a polymer sheath covering the metallic body.

16 Claims, 4 Drawing Sheets

(56) References Cited

U.S. PATENT DOCUMENTS

| | | | |
|---|---|---|---|
| 5,560,881 A * | 10/1996 | Hillman | B28B 7/346 |
| | | | 264/225 |
| 5,740,593 A | 4/1998 | Sheehan et al. | |
| 5,952,075 A * | 9/1999 | Clarke | D03D 13/004 |
| | | | 428/222 |
| 6,083,436 A | 7/2000 | Thompson et al. | |
| 6,190,602 B1 | 2/2001 | Blaney et al. | |
| 6,203,738 B1 | 3/2001 | Vaders | |
| 6,233,797 B1 | 5/2001 | Neely et al. | |
| 7,052,632 B2 | 5/2006 | Lavasserie et al. | |
| 7,200,912 B2 | 4/2007 | Bouillon et al. | |
| 7,238,247 B2 | 7/2007 | Bouillon et al. | |
| 7,997,891 B2 | 8/2011 | Gallagher et al. | |
| 8,128,775 B2 | 3/2012 | Maheshwari et al. | |
| 8,192,662 B2 | 6/2012 | Asahara et al. | |
| 8,216,641 B2 | 7/2012 | Bouchard et al. | |
| 8,448,310 B2 | 5/2013 | Vincent | |
| 9,017,761 B2 | 4/2015 | La Forest et al. | |
| 9,475,254 B2 | 10/2016 | Beraud et al. | |
| 9,546,438 B2 | 1/2017 | Fiala | |
| 10,005,246 B2 | 6/2018 | Stepanski | |
| 10,850,456 B2 | 12/2020 | Chassignet | |
| 12,318,964 B2 * | 6/2025 | Pujar | B29B 11/16 |
| 12,421,637 B2 * | 9/2025 | Pujar | D04H 1/46 |
| 2003/0121380 A1 * | 7/2003 | Cowell | A61F 13/15707 |
| | | | 83/660 |
| 2004/0175553 A1 | 9/2004 | Bouillon et al. | |
| 2008/0125745 A1 * | 5/2008 | Basu | A61M 25/00 |
| | | | 604/173 |
| 2008/0287884 A1 * | 11/2008 | Warden | A61M 5/3243 |
| | | | 604/220 |
| 2010/0163167 A1 | 7/2010 | Maheshwari et al. | |
| 2010/0282886 A1 | 11/2010 | Pallmann | |
| 2011/0154629 A1 * | 6/2011 | Delecroix | D04H 18/00 |
| | | | 28/115 |
| 2015/0001834 A1 * | 1/2015 | Wisniewski | B26F 1/24 |
| | | | 29/897.2 |
| 2016/0185092 A1 * | 6/2016 | Chamberlain | B29C 65/564 |
| | | | 156/242 |
| 2017/0268141 A1 | 9/2017 | Sheehan et al. | |
| 2018/0105471 A1 | 4/2018 | Shi | |
| 2018/0147797 A1 | 5/2018 | Chassignet | |
| 2022/0145775 A1 | 5/2022 | Dambrine et al. | |
| 2024/0109223 A1 | 4/2024 | Lenz | |
| 2024/0158970 A1 * | 5/2024 | Pujar | D04H 1/46 |
| 2024/0308922 A1 * | 9/2024 | Kole | D04H 18/02 |

FOREIGN PATENT DOCUMENTS

| | | | |
|---|---|---|---|
| CN | 112077930 A | 12/2020 | |
| CN | 108127937 B | 1/2021 | |
| DE | 2343646 A1 | 3/1975 | |
| DE | 3715409 A1 | 12/1987 | |
| DE | 10356900 A1 * | 7/2005 | B26D 1/0006 |
| EP | 4344843 A1 | 4/2024 | |
| GB | 2025302 A | 1/1980 | |
| GB | 2606342 A | 11/2022 | |
| KR | 101394955 B1 | 5/2014 | |
| WO | 9731772 A1 | 9/1997 | |
| WO | 2014150393 A2 | 9/2014 | |
| WO | 2020178500 A1 | 9/2020 | |

OTHER PUBLICATIONS

Clark, S.L. (1982). Release Agents. In: Lubin, G. (eds) Handbook of Composites. Springer, Boston, MA. https://doi.org/10.1007/978-1-4615-7139-1_23 (Year: 1982).*

Zhang, CN 201483574 U, Machine Translation, May 26, 2010 (Year: 2010).*

Extended European Search Report for EP Application No. 24163852.7, dated Dec. 2, 2024, 17 pages.

Extended European Search Report for EP Application No. 24163907.9, dated Aug. 16, 2024, 5 pages.

Partial European Search Report for EP Application No. 24163852.7, dated Jul. 30, 2024, 12 pages.

* cited by examiner

SHEATHED METALLIC NEEDLES FOR PRODUCING Z-CHANNELS IN FIBROUS PREFORMS

BACKGROUND

The present invention relates to the fabrication of ceramic matrix composites (CMCs) and, more particularly, to CMCs having improved properties for operating in gas turbine engines.

In the processing of CMCs, there is a need to infiltrate matrix within and around fibrous tows to replace pore volume with dense matrix material. In a woven system, large voids often exist between adjacent tows of a preform. Such voids can become large defects after infiltration of the composite that are detrimental to composite properties. The pore network through a woven system is often highly tortuous for infiltrating reactant vapors, which leads to uneven deposition through the thickness of the preform.

The formation of z-channels can create more direct pathways for reactant gases. However, the metallic needles commonly used to form z-channels can contaminate and/or deform the preform. For example, metallic particles from the needles can remain in the preform after needle removal. Such particles and the preform ceramic material(s) have dissimilar thermal and mechanical properties, thus their presence in the final CMC can be detrimental. Additionally, needle removal can create localized deformations (i.e., from "springback") on the preform surfaces leading to defects after chemical vapor infiltration (CVI). Improved means for perforating preforms are therefore desirable.

SUMMARY

A needle array suitable for perforating a fibrous preform includes a backplate, a plurality of needles removably attached to and extending away from the backplate, and a collar disposed around each of the plurality of needles. Each of the plurality of needles includes a metallic body, and a polymer sheath covering the metallic body.

An assembly includes a tooling fixture for mounting a fibrous preform therein, the tooling fixture including a plurality of infiltration holes, and a needle array including a backplate, and a plurality of needles removably attached to and extending away from the backplate. Each of the plurality of needles includes a metallic body, and a polymer sheath covering the metallic body. Each of the plurality of needles is aligned with a respective infiltration hole of the plurality of infiltration holes.

A method of preparing a fibrous preform for use in a ceramic matrix composite includes inserting a plurality of needles belonging to a needle array through the fibrous preform, removing the plurality of needles to form a plurality of z-channels in the fibrous preform, and subsequently heating the fibrous preform to decompose polymer contaminants within the plurality of z-channels. Each of the plurality of needles includes a metallic body, and a polymer sheath covering the metallic body.

Figure 1:
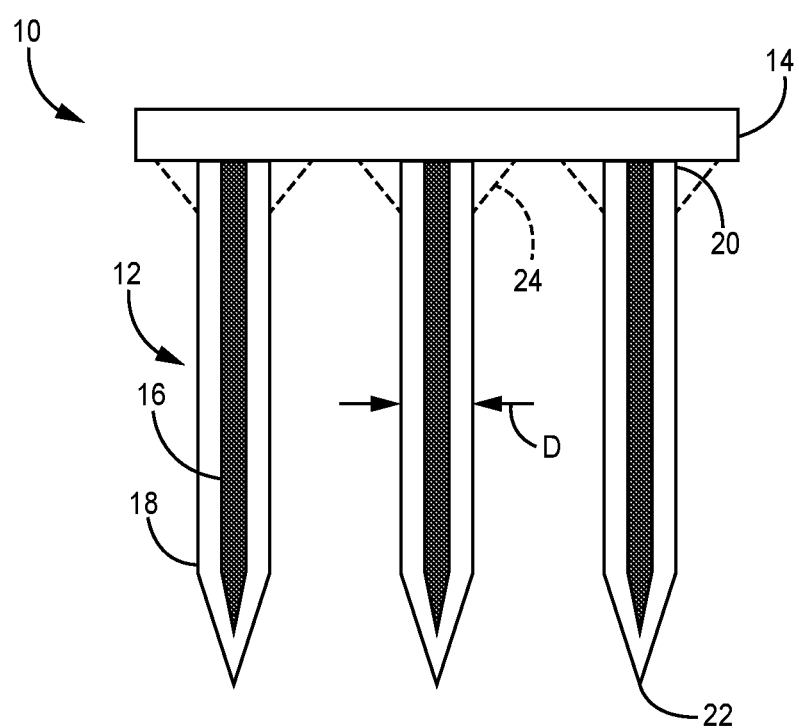
FIG. 1 is a simplified cross-sectional view of a needle array for creating z-channels in a fibrous preform.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a means for forming z-channels in a fibrous preform with reduced risk of contamination and/or surface deformation. More specifically, polymer sheaths can be formed over needles used to perforate preforms. Any polymer contaminants left in the preform are more easily removed than metallics. Further, the polymer sheaths can protect the underlying needles to extend useful life.

FIG. 1 is a simplified cross-sectional illustration of needle array 10. Needle array 10 includes a plurality of needles 12 extending away from backplate 14. Needles 12 can be arranged in columns and rows, or other patterns. Needles 12 can be removably connected (e.g., via threaded engagement, mounting pins, etc.) to backplate 14 in an exemplary embodiment, and monolithically formed (e.g., via additive manufacturing) in an alternative embodiment. Each needle 12 can include metallic body 16 and polymer sheath (or coating) 18. Backplate 14 can be formed from a metallic material. As shown, each needle 12 has a relatively short taper and is generally cylindrical along most of its length between base 20 and tip 22. Medium to long tapers are also contemplated herein. Needle geometry is defined by the underlying metallic bodies 16. Polymer sheaths 18 can be formed from polyvinyl alcohol (PVA), polyvinyl butyral (PVB), or another suitable low-char polymer. Polymer sheaths 18 can be formed on metallic bodies by a spraying or melt-dipping process. As such, polymer sheaths 18 can be reapplied throughout the lifecycle of a given needle 12 or needle array 10, as repeated use causes wear to polymer sheaths 18 and underlying metallic bodies 16. Each needle 12 can have a diameter D ranging from 100 microns to 1,000 microns, with all needles of a given needle array 10 having generally uniform diameters with respect to one another. Each polymer sheath 18 can be applied such that it only nominally increases the diameter of a respective needle 12, having a uniform thickness of about 0.05 microns to 127 microns, 0.05 microns to 50.8 microns, or 0.05 microns to 0.1 microns. Each polymer sheath 18 should be applied and/or maintained to cover a respective metallic body 16 substantially if not completely.

Needle array 10 can further include an optional collar 24 (shown with dashed lines in FIG. 1) around each needle 12. Each collar 24 can have a frustoconical geometry tapering from a widest diameter proximate backplate 14 to a narrowest diameter as it reaches the exterior of needle 12 formed by polymer sheath 18. For assembly of needle array 10, collars can be inserted over needles 12, or attached to backplate 14 prior to the attachment of needles 12. Collars 24 need not be positioned against/in contact with backplate 14 but can be offset from backplate 14 (as shown in FIG. 4). Collars 24 can be similarly formed from a polymer-coated metallic material. Exemplary polymers can include PVA or PVB. In an alternative embodiment, collars 24 can be formed from a hardened plastic. Collars 24 can be used to compress the preform surface (labeled in FIGS. 2 and 3) during insertion of needles to minimize frays at the preform surface from localized preform springback.

Figure 2:
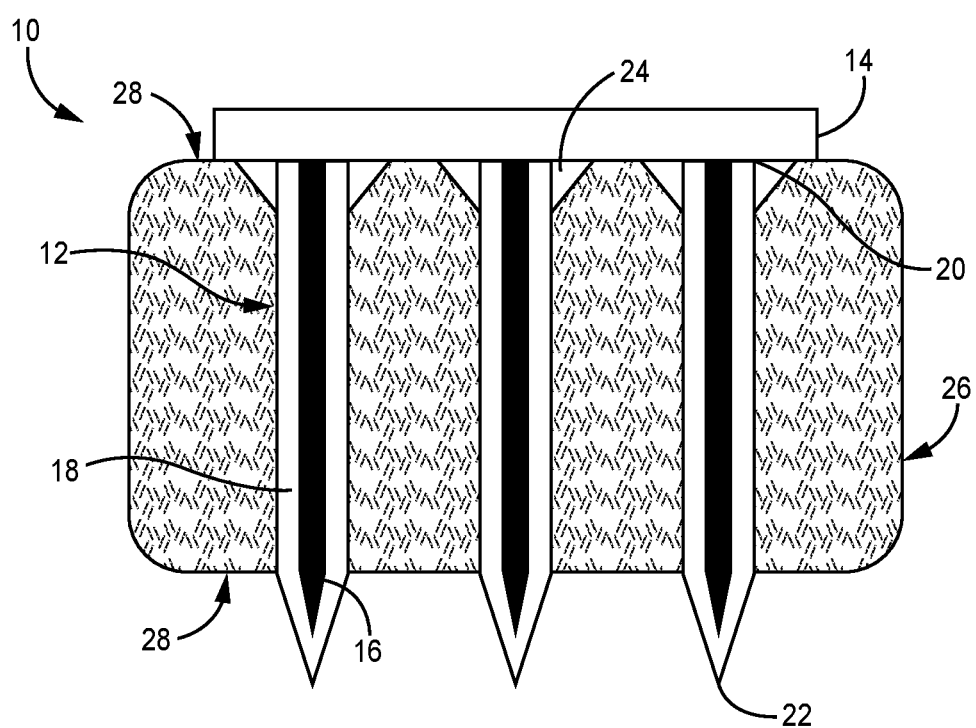
FIG. 2 is a simplified cross-sectional view of the needle array of FIG. 1 inserted in a fibrous preform.

FIG. 2 is a simplified cross-sectional illustration of needle array 10 inserted into preform 26. Preform 26 can be formed from ceramic (e.g., silicon carbide-SiC) tows arranged in one of various two or three-dimensional woven architectures such as plain, harness (e.g., 3, 5, 8, etc.), twill, braid, or non-symmetric to name a few non-limiting examples. Non-woven architectures (e.g., chopped, felted, etc.) are also contemplated herein. As shown, needles 12 extend completely through the thickness of preform 26, that is between opposing (i.e., inner and outer) surfaces 28. Although collars 24 are shown inserted into preform 26 such that plate 14 is near or flush with surface 28, collars 24, if included on needle array 10, need not be inserted to such extent. Prior to the insertion of needles 12, preform 26 can be in a dry but sized/re-sized state, or wetted with a liquid polymer tackifier. Needles 12 can be inserted through preform 26 at either surface 28, or sequentially through both surfaces 28.

Figure 3:
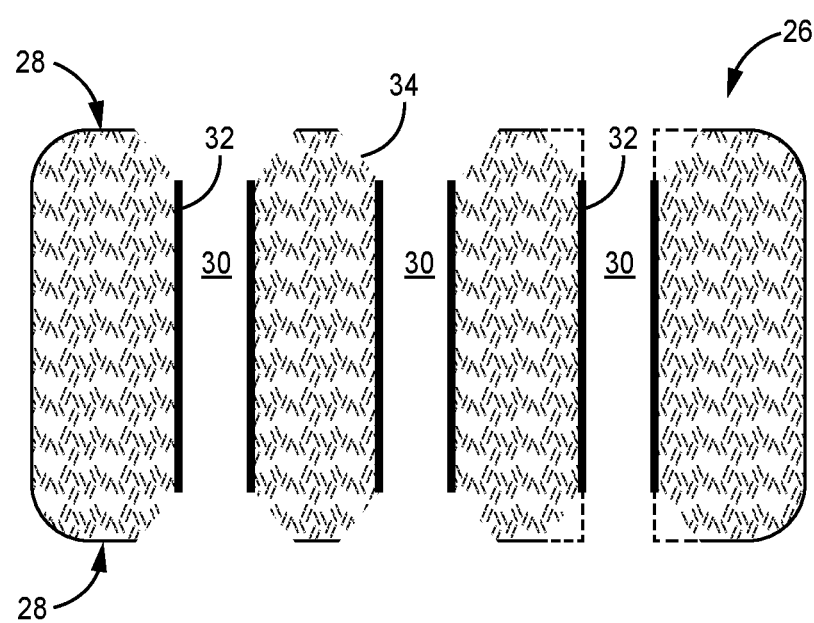
FIG. 3 is a simplified cross-sectional view of the fibrous preform after removal of the needle array.
Figure 4:
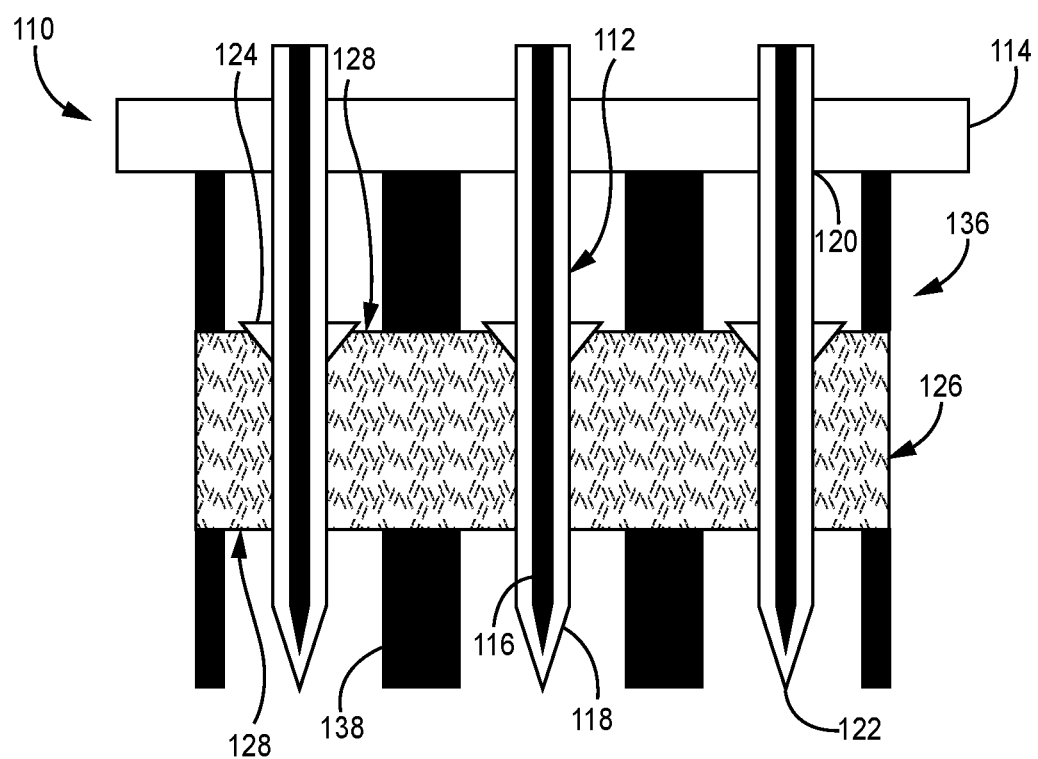
FIG. 4 is a simplified cross-sectional view of an alternative needle array for use with tooling-mounted fibrous preforms.

FIG. 3 is a simplified cross-sectional illustration of preform 26 of FIG. 2 after the removal of needle array 10, which may have been inserted through each surface 28 of preform 26. As can be seen in FIG. 3, needles 12 form z-channels 30 extending through the thickness of preform 26. Contaminants 32 can variously be left behind in preform 26 as a result of the contact between polymer sheaths 18 and the ceramic tows of preform 26. Contaminants 32 are pieces (e.g., flakes, particles, etc.) of polymer sheaths 18 and are therefore the same material as polymer sheaths 18. Contaminants 32 can be thermally decomposed, in one example, during subsequent processing of preform 26 in which preform 26 is exposed to high temperatures. Such processing can include using CVI to form an interface coating (IFC) and/or CVI to form the ceramic (e.g., SiC) matrix.

Preform 26 can include angled segments 34 extending away from z-channels 30, which can result from pushing collars 34 into a respective surface 28 of preform 26. Z-channels 30 are otherwise cylindrical, corresponding to needle 12 geometry. If collars 24 are not included on needle array 10, or if needles 12 are inserted such that collars 24 do not make significant contact with preform 26, angled segments 34 may not be formed, and z-channels 30 can be entirely cylindrical, as is represented in dashed lines in the right-most z-channel 30 in FIG. 3.

FIG. 4 is a simplified cross-sectional illustration of an alternative needle array 110. which is arranged to complement tooling fixture 136. Tooling fixture 136 can be a graphite tooling fixture used for supporting preform 126 during CVI and other processing steps. Needle array 110 is substantially similar to needle array 10 of FIGS. 1 and 2, having needles 112 removably mounted to and extending from backplate 114. Each needle 112 includes metallic body 116 with outer polymer sheath 118. Metallic bodies 116 and polymer sheaths 118 can be made from the same materials as metallic bodies 16 and polymer sheaths 18, respectively, and similarly formed. Needles 112 have a relatively short taper and are generally cylindrical between base 120 and tip 122. Collars 124 are also optionally included.

Needle array 110 differs slightly in that needles 112 must be inserted through infiltration holes 138 of tooling fixture 136, in which preform 126 is mounted, in order to reach preform 126. Accordingly, needles 112 can be arranged on backplate 114 to correspond/align with infiltration holes 138. Backplate 114 delimits the extent to which needles 112 can be inserted into preform 126, as collars 124 and needles 112 have smaller respective diameters than infiltration holes 138. Collars 124 can therefore be mounted around needles 112 in a position offset from backplate 114. The z-channels formed by needle array 110 otherwise will be substantially similar to those shown in and discussed with respect to FIG. 3, extending through the entire thickness of preform 126 between opposing surfaces 128. Although shown in isolation from a tooling fixture in FIGS. 1 and 2, needle array 10 can also be used with a tooling fixture.

A CMC component formed with the disclosed perforating means can be incorporated into aerospace, maritime, or industrial equipment, to name a few, non-limiting examples.

Discussion of Possible Embodiments

The following are non-exclusive descriptions of possible embodiments of the present invention.

A needle array suitable for perforating a fibrous preform includes a backplate, a plurality of needles removably attached to and extending away from the backplate, and a collar disposed around each of the plurality of needles. Each of the plurality of needles includes a metallic body, and a polymer sheath covering the metallic body.

The needle array of the preceding paragraph can optionally include, additionally and/or alternatively, any one or more of the following features, configurations and/or additional components:

In the above needle array, the polymer sheath can include one of polyvinyl alcohol and polyvinyl butyral.

In any of the above needle arrays, the collar can be formed from a polymer material. In any of the above needle arrays, the collar can abut the backplate.

In any of the above needle arrays, the collar can have a frustoconical geometry tapering from widest proximate the backplate to narrowest distal from the backplate.

In any of the above needle arrays, each of the plurality of needles can have a diameter ranging from 100 microns to 1,000 microns.

In any of the above needle arrays, a thickness of the polymer sheath can range from 0.05 microns to 127 microns.

An assembly includes a tooling fixture for mounting a fibrous preform therein, the tooling fixture including a plurality of infiltration holes, and a needle array including a backplate, and a plurality of needles removably attached to and extending away from the backplate. Each of the plurality of needles includes a metallic body, and a polymer sheath covering the metallic body. Each of the plurality of needles is aligned with a respective infiltration hole of the plurality of infiltration holes.

The assembly of the preceding paragraph can optionally include, additionally and/or alternatively, any one or more of the following features, configurations and/or additional components:

In the above assembly, the tooling fixture can be formed from graphite.

In any of the above assemblies, the polymer sheath can include one of polyvinyl alcohol and polyvinyl butyral.

In any of the above assemblies, each of the plurality of needles can have a diameter ranging from 100 microns to 1,000 microns.

In any of the above assemblies, a thickness of the polymer sheath can range from 0.05 microns to 127 microns.

Any of the above assemblies can further include a collar disposed around each of the plurality of needles.

In any of the above assemblies, the collar can be coated with a polymer material.

In any of the above assemblies, the collar can be offset from the backplate.

In any of the above assemblies, the collar cane have a frustoconical geometry.

A method of preparing a fibrous preform for use in a ceramic matrix composite includes inserting a plurality of needles belonging to a needle array through the fibrous preform, removing the plurality of needles to form a plurality of z-channels in the fibrous preform, and subsequently heating the fibrous preform to decompose polymer contaminants within the plurality of z-channels. Each of the plurality of needles includes a metallic body, and a polymer sheath covering the metallic body.

The method of the preceding paragraph can optionally include, additionally and/or alternatively, any one or more of the following features, configurations and/or additional components:

In the above method, the polymer sheath can be formed from one of polyvinyl alcohol and polyvinyl butyral.

In any of the above methods, the contaminants can be formed from the same material as the polymer sheath.

In any of the above methods, the step of heating the fibrous preform can occur during chemical vapor infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A needle array suitable for perforating a fibrous preform, the needle array comprising:
   a backplate;
   a plurality of needles removably attached to and extending away from the backplate; and
   a plurality of collars, each of the plurality of collars disposed around a respective needle of the plurality of needles and having frustoconical geometry tapering from widest proximate the backplate to narrowest distal from the backplate;
   wherein each of the plurality of needles and each of the plurality of collars comprises:
   a metallic body; and
   a polymer sheath covering the metallic body, the polymer sheath comprising one of polyvinyl alcohol and polyvinyl butyral.

2. The needle array of claim 1, wherein the collar abuts the backplate.

3. The needle array of claim 1, wherein each of the plurality of needles has a diameter ranging from 100 microns to 1,000 microns.

4. The needle array of claim 3, wherein a thickness of the polymer sheath ranges from 0.05 microns to 127 microns.

5. The needle array of claim 1, wherein the collar is offset from the backplate.

6. The needle array of claim 1, wherein the plurality of needles have a cylindrical geometry between a base and a tip.

7. An assembly comprising:
   a tooling fixture configured to mount a fibrous preform therein during a chemical vapor infiltration process, the tooling fixture comprising a plurality of infiltration holes configured to receive infiltrating reactant vapors; and
   a needle array comprising:
   a backplate;
   a plurality of needles removably attached to and extending away from the backplate, each of the plurality of needles comprising:
   a metallic body; and
   a polymer sheath covering the metallic body, the polymer sheath comprises one of polyvinyl alcohol and polyvinyl butyral;
   wherein each of the plurality of needles is aligned with a respective infiltration hole of the plurality of infiltration holes; and
   a plurality of collars, each of the plurality of collars disposed around a respective needle of the plurality of needles in a position offset from the backplate.

8. The assembly of claim 7, wherein the tooling fixture is formed from graphite.

9. The assembly of claim 7, wherein each of the plurality of needles has a diameter ranging from 100 microns to 1,000 microns.

10. The assembly of claim 9, wherein a thickness of the polymer sheath ranges from 0.05 microns to 127 microns.

11. The assembly of claim 7, wherein each of the plurality of collars is formed from a polymer-coated metallic material.

12. A method of preparing a fibrous preform for use in a ceramic matrix composite, the method comprising:
   inserting a plurality of needles belonging to a needle array through the fibrous
   preform, each of the plurality of needles comprising:
   a metallic body; and
   a polymer sheath covering the metallic body;
   removing the plurality of needles to form a plurality of z-channels in the fibrous preform; and
   subsequently, heating the fibrous preform to decompose polymer contaminants within the plurality of z-channels;
   wherein a respective collar is disposed around each of the plurality of needles, each collar comprising:
   a metallic body; and
   a polymer sheath covering the metallic body; and
   wherein the fibrous preform is mounted in a tooling fixture comprising a plurality of infiltration holes configured to receive infiltrating reactant vapors during a chemical vapor infiltration process and wherein each of the plurality of needles is aligned with a respective infiltration hole of the plurality of infiltration holes.

13. The method of claim 12, wherein the polymer sheath of each of the plurality of needles and each collar is formed from one of polyvinyl alcohol and polyvinyl butyral.

14. The method of claim 13, wherein the contaminants are formed from the same material as the polymer sheath.

15. The method of claim 12, wherein the step of heating the fibrous preform occurs during chemical vapor infiltration.

16. The method of claim 12, wherein the plurality of needles are removably attached to and extend away from a backplate and wherein each collar is offset from the backplate.

* * * * *